United States Patent [19]

Joel, Jr.

[11] 4,156,108

[45] May 22, 1979

[54] PULSE PRODUCING SYSTEM FOR SECRECY TRANSMISSIONS

[75] Inventor: Amos E. Joel, Jr., New York, N.Y.

[73] Assignee: Bell Telephone Laboratories, Incorporated, Murray Hill, N.J.

[21] Appl. No.: 725,687

[22] Filed: Jan. 31, 1947

[51] Int. Cl.$^2$ ............................................... H04K 1/00
[52] U.S. Cl. .................................. 179/1.5 R; 328/39; 328/41; 179/15 BF; 340/345
[58] Field of Search ..................... 179/1.5 15 P, 1.5 C, 1.5 M, 179/1.5 R, 15 BF; 250/27 SW, 27 CC, 27 TR; 331/78; 328/39, 43, 41; 340/345

[56] References Cited

U.S. PATENT DOCUMENTS

| | | | |
|---|---|---|---|
| 3,405,362 | 10/1968 | Badgley et al. | 179/1.5 R |
| 3,701,848 | 10/1972 | Dehn | 179/1.5 R |
| 3,953,678 | 4/1976 | Gannett | 179/1.5 R |
| 3,965,297 | 6/1976 | Gannett | 179/1.5 R |
| 3,968,454 | 7/1976 | Busch | 179/1.5 R |
| 3,976,839 | 8/1976 | Miller | 179/1.5 R |
| 3,983,327 | 9/1976 | Gannett et al. | 179/1.5 R |

*Primary Examiner*—Howard A. Birmiel
*Attorney, Agent, or Firm*—H. A. Burgess; Robert J. Fluskey

EXEMPLARY CLAIM

1. In a system for transmitting a quantized signal having a definite maximum value, a reentry circuit comprising a cyclically operating electronic stepper having a cycle length in step-positions corresponding to the number of steps represented by said maximum value, and successively stepping in response to step-signal input thereto, each position of said stepper including means determinative of the generation of a respective one of three-or-more valued signals, and said circuit including means for, in effect, cancelling, once or more, from the output of said circuit a preassigned whole number of said signal steps whenever the output signal value would exceed said maximum value, and means for converting a group of different step-valued signals into a series of step-pulses to step said stepper around from an initial position through the number of steps represented by said series of pulses.

13. In a system for combining and individually weighting indications each in the form of a marking voltage on a conductor, means to translate each marking voltage in succession into a number of pulses determined by the weighting factor assigned to the particular conductor, a register operating in a closed cycle, said register having positions equal in number to the range of values to be indicated, means to cause said pulses to step said register around through one or more of its cycles and to stop in the position determined by the total number of said pulses, an output circuit, and means to produce an output current in said circuit the value of which is different for each different position in which said register stops.

19. In combination, stepping means for generating multivalued signals, pulsing means for driving said stepping means, a plurality of testing points, means for distributing said signals in random manner over said testing points, and means for testing said points for producing a number of pulses determined by the signal indicated and the weighting factors assigned to respective points, said last-mentioned means including means for driving said pulsing means at preassigned interval.

23 Claims, 7 Drawing Figures

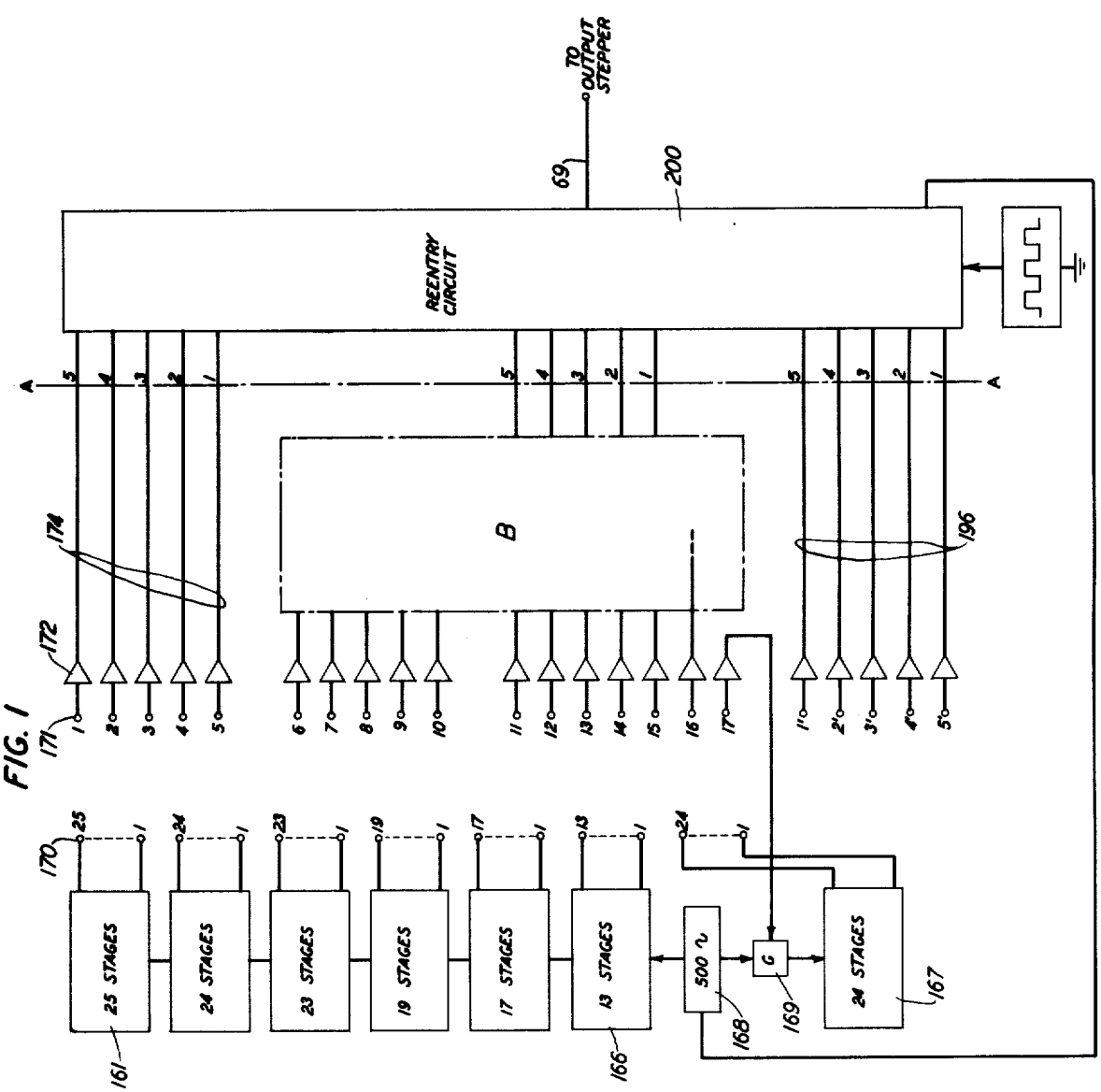
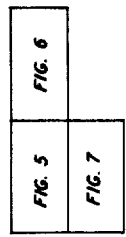
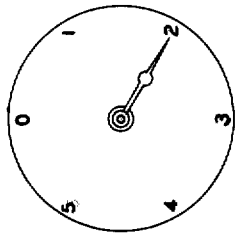

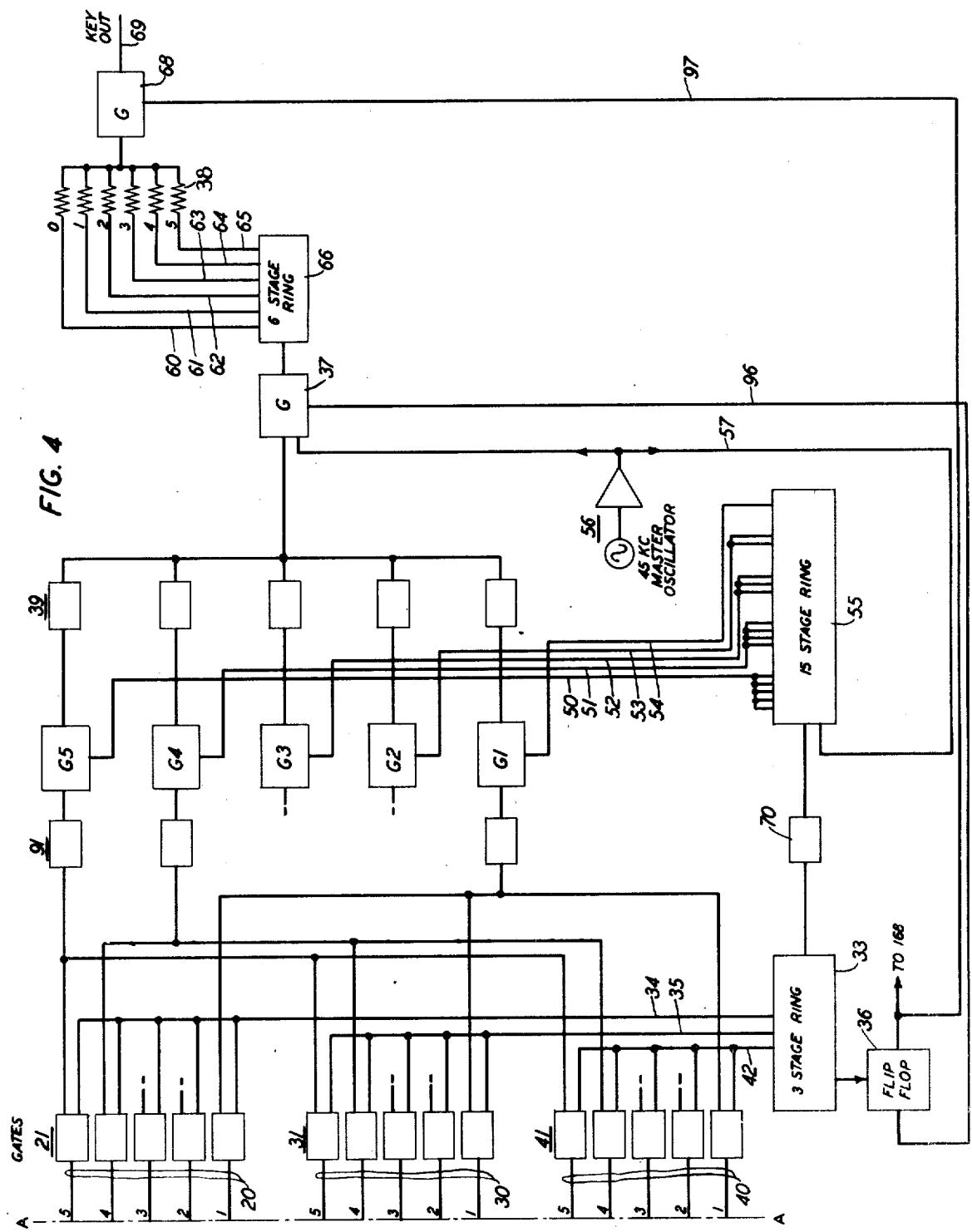

PULSE PRODUCING SYSTEM FOR SECRECY TRANSMISSIONS

The present invention relates to a quantizing circuit of a type which may be used, among other things, in a pulse producing system in which the pulses have amplitudes varying in definite amplitude steps for signaling or other purposes.

The invention will be illustrated as embodied in a key pulse producing system for generating pulses of irregularly varying amplitudes which may in turn be used for keying signals for purposes of secrecy of transmission. In such a system, it is desired to generate identical pulses at different localities in unison, so as to be able to use the pulses to encipher sent signals and to decipher the received signals. It is desired to generate these key pulses by means local to the given station, and in accurately timed relation to the distantly generated identical pulses. It is also essential that the pulses have highly irregular and practically fortuitous variation from pulse to pulse, in order to defeat attempts to discover the key.

One important aid in the attainment of nearly random distribution of pulses by combination of pulses originating in apparatus of reproducible form, and, therefore, of predictable performance, is the process known as reentry by which summations of pulses are reduced in value by subtraction of definite whole numbers of steps. This process allows of greater indeterminacy within a limited range of values by first adding irregularly produced pulses to give a much wider total range of values, and then arbitrarily subtracting a fixed value one or more times as may be necessary to reach a value of pulse within the limited range. For example, if the total range of key pulses to be eventually used is 0, 1, 2, 3, 4, 5 steps, a reentry value of 6 may be used, this value being subtracted one or more times depending on the summation pulse value. If, then, an irregular range of pulse values from 0 to some such upper limit, for example as 29 steps, is obtained as a result of combining primary pulses, it is necessary to provide for the subtraction of fixed quantities corresponding to either 6, 12, 18 or 24 pulses, depending upon the value of the summation pulse, to bring the final pulse into the specified range of 0 to 5 steps. This means, of course, that step 4, for instance, would result from a summation pulse of either 4 steps, 10 steps, 16 steps, 22 steps or 28 steps. The occurrence of a step-4 pulse would give no information as to which of these five different summation pulse values was responsible for the 4-step pulse.

Reentry circuits are known in which the subtraction in pulse value is obtained by the subtraction of direct current voltages in a resistive circuit, as by passing quanta of current through a resistor obtained by changing the current from that corresponding to the "cut-off" current of a tube to that corresponding to the saturation current of the tube, in the case of either an electron discharge vacuum tube or an ionized gas tube. By use of more than one such reentry tube, the subtraction of multiples of the reentry value can be made.

The present invention is based on a different principle of operation in that it need not make use of either voltage additions or subtractions, and in that it is not subject in this respect to voltage and tube variables. The present invention counts the steps in time sequence for a measured interval (corresponding to the value assigned to the summation pulse) and in so doing drops back, as it were, by a whole number of steps (such as six) whenever the count would otherwise exceed such number. Voltage addition need be made only in the weighting of the final pulses to their respective step values.

The object of the invention is a novel method of and means for pulse quantizing, a further object being to perform reentry of pulse values in a direct and positive manner by pulse counting.

These and other objects of the invention, together with its various characterizing features and its mode of construction and operation, will be made clear in the following detailed description in connection with the accompanying drawing in which:

FIG. 1 is a block schematic diagram showing in a general way one type of key generating circuit to which the invention will be illustrated as applied;

FIG. 4 is a block schematic diagram showing the component parts of a reentry circuit in accordance with the present invention;

Figure 5:
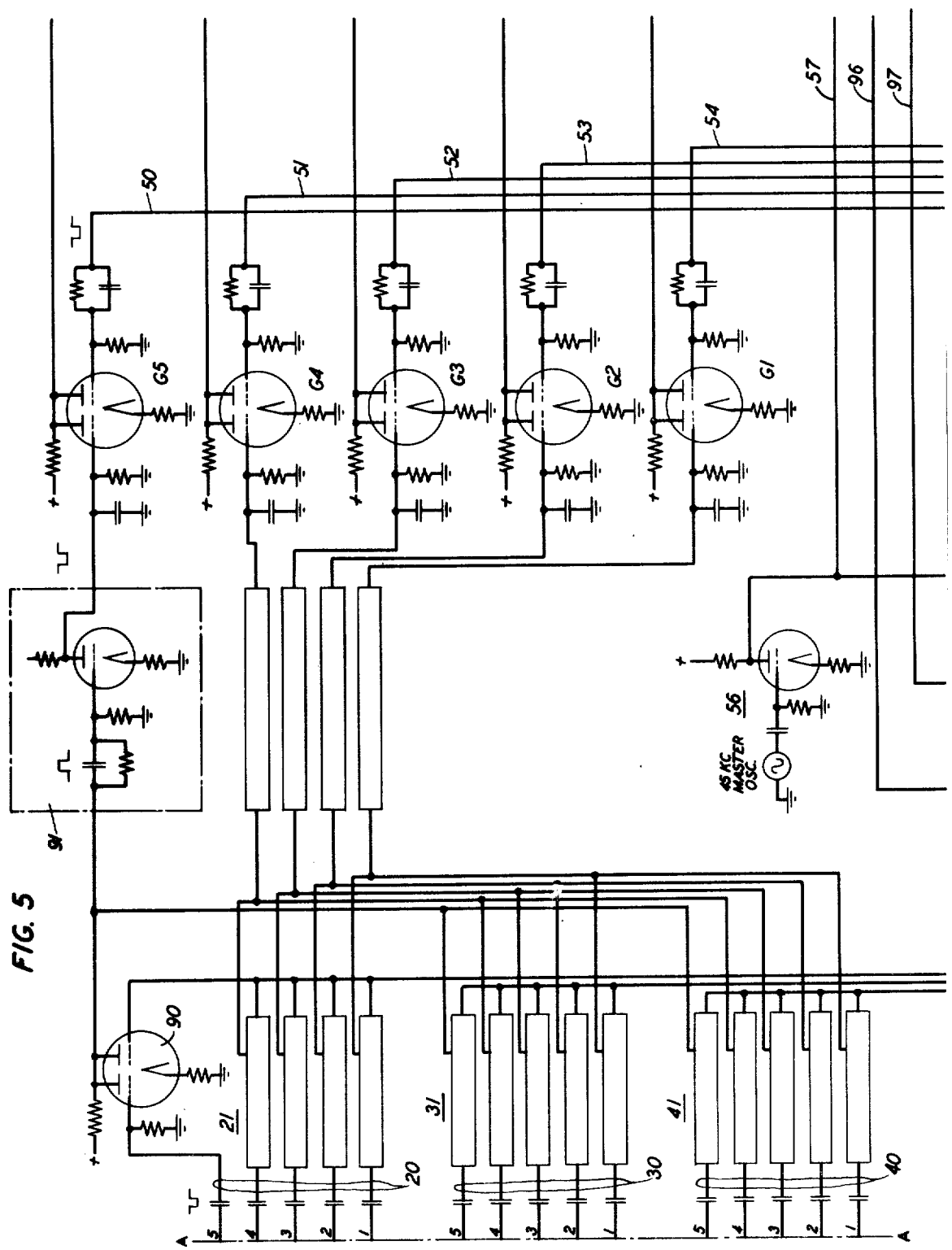
Figure 6:
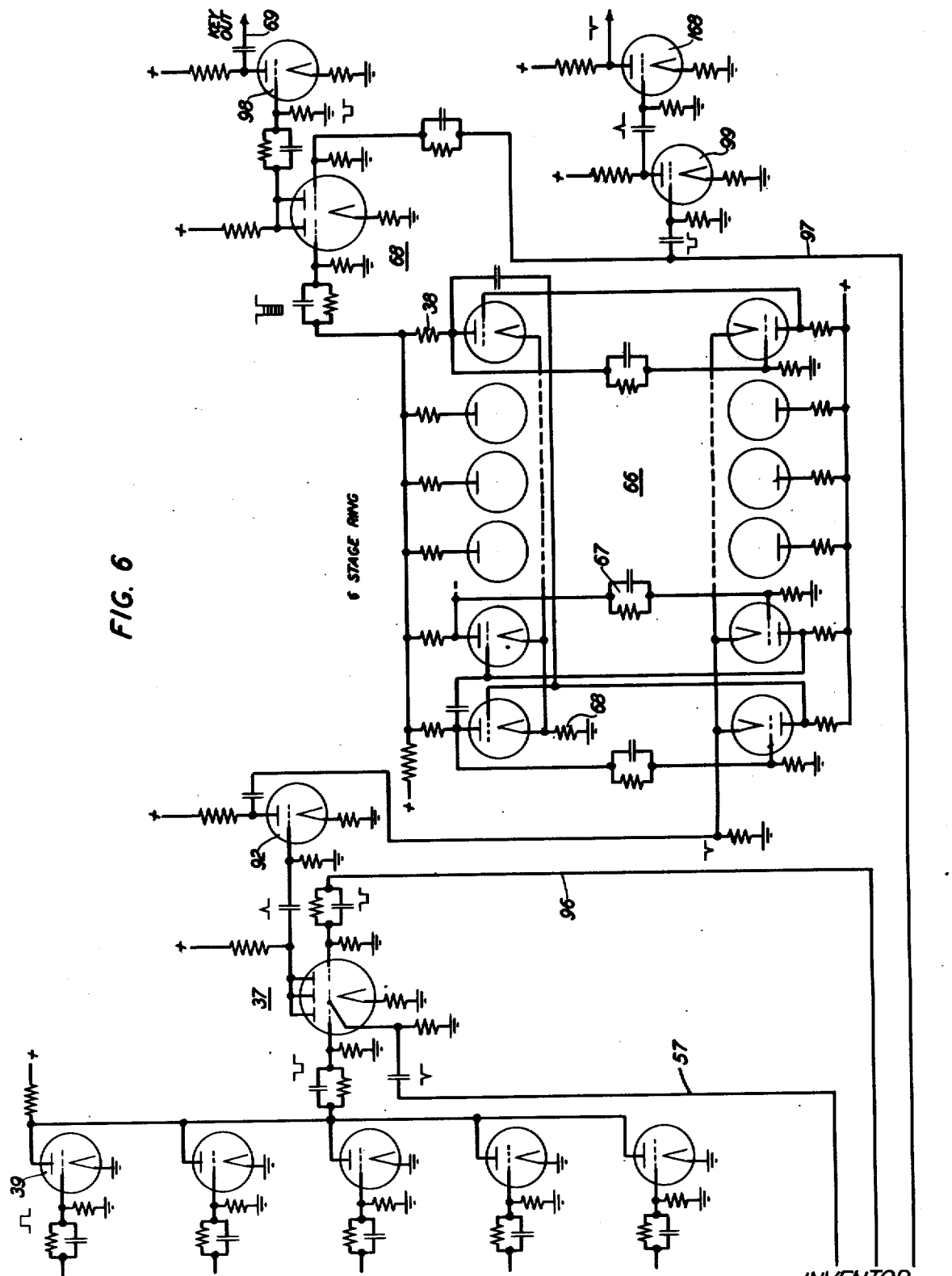
Figure 7:
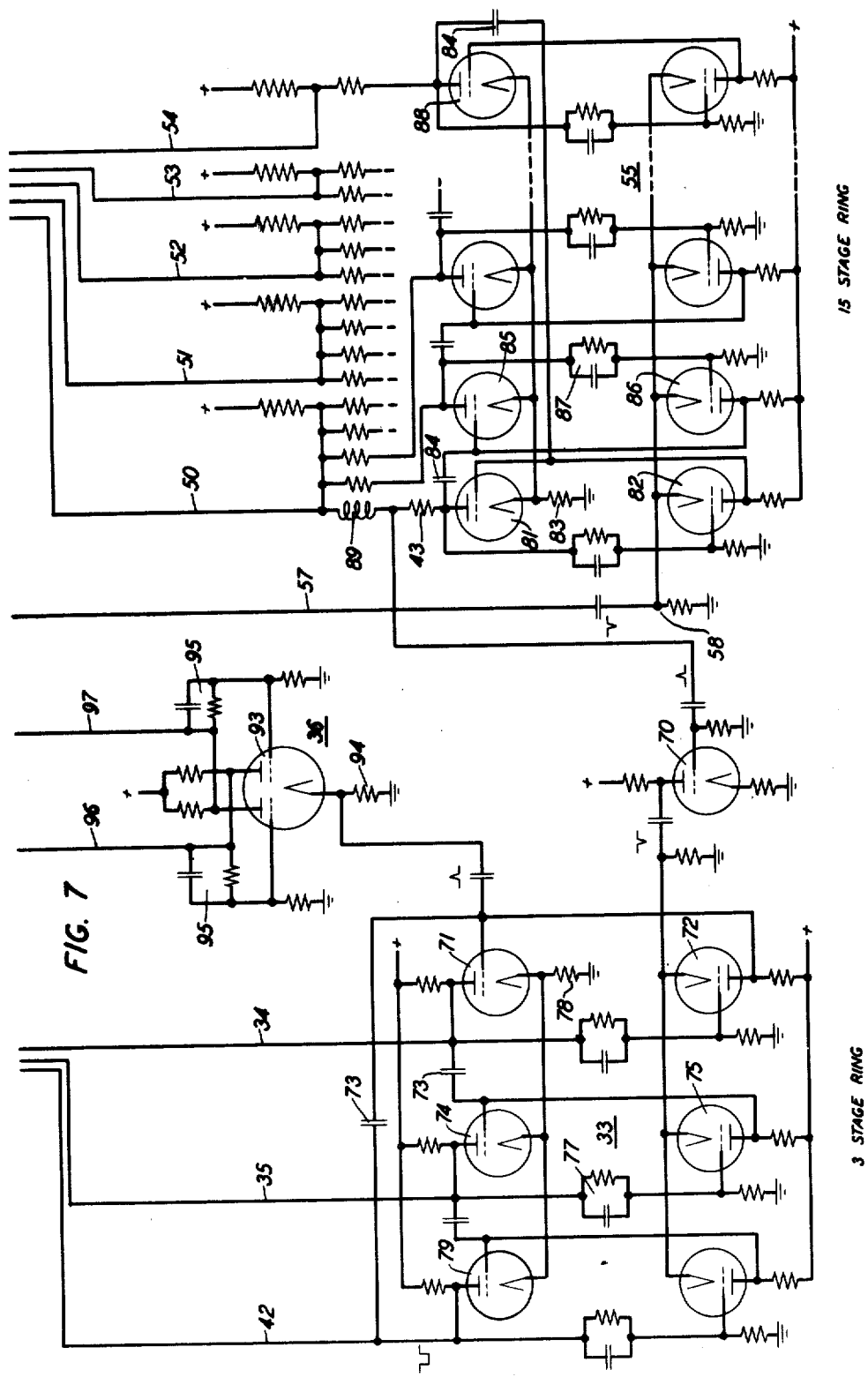

FIGS. 5, 6 and 7, when placed next to one another in accordance with the key given in FIG. 2, show in circuit schematic form the details of the reentry circuit shown more generally in FIG. 4; and FIG. 3 is a diagram referred to in explaining the principle of operation of the invention.

While the invention is capable of application to many forms of pulsing circuits, applicant has chosen to illustrate the particular embodiment of his invention herein as applied to a key producing circuit disclosed and claimed in an application of A. J. Busch, Ser. No. 555,914, filed Sept. 27, 1944 now U.S. Pat. No. 3,968,454, and more particularly as applied to the system shown in FIG. 8 of the Busch application.

FIG. 1 corresponds to FIG. 8 of the Busch application, and is the same as Busch's FIG. 8 except for the addition of a connection between the reentry circuit and the driving pulse source 168 for the ring circuits 161 . . . 166; and the omission of some circuit details from the part of the circuit represented by the dash-line rectangle B in the central part of the figure, these details having been omitted to simplify the drawing, although they may be assumed present in an actual embodiment. FIG. 1 is included herein to show the exact manner in which the reentry circuit of the present invention may be substituted for the reentry circuit in Busch's FIG. 8. The portion of FIG. 1 to the right of the line A—A is removed and the circuit of the present invention is to be considered as replacing the portion so removed. This is indicated in FIG. 4 (and again in FIG. 5) where the fifteen input conductors are shown as beginning at the line A—A of the figure.

In FIG. 1 six discharge-tube ring circuits 161 . . . 166, each containing a different number of stages as indicated, have their individual stage outputs connected to a group of terminals 170. Each of these ring circuits may be similar to the rings G, H and I of Busch's application (without the reversing and switching tubes). The ring 161, therefore, produces pulses in rotation over the output terminals 1 to 25 of the group 170. The other rings similarly produce pulses in rotation over the output terminals connected to them. These rings are driven in unison from a 500-cycle source 168 controlled from the reentry circuit as described more fully hereinafter, and therefore they take five hundred steps per second. Another twenty-four-stage ring 167 is also driven from this same source through a gate 169 which causes this ring to lose a step occasionally as will be described.

Opposite the terminals 170 are arranged a second group of terminals 171 comprising a group of terminals 1 to 17 and a special group of terminals 1' to 5'. Each one of the terminals in the group 171 leads to the input of a phase reversing tube 172 for the purpose of producing positive pulses in the outgoing conductor groups. Flexible connections (not shown) are provided for connecting various terminals of the group 170 to the first seventeen conductors of the group 171. For example, of the one hundred and forty-five terminals in group 170, from about sixty to about one hundred may be connected at any one time to the terminals 1 to 17 of group 171. This means, of course, that some or all of the latter terminals will be multiplied to a number of terminals in the group 170. These connections may be changed from time to time, such as once a day, in accordance with a prearranged program.

Terminal 17 is connected to one of the input control points of the gate 169. This gate is an electron switch and may be similar in construction and operation to other gates shown in detail in Busch's application. It operates to supply negative cathode voltage to the ring 167 to cause the latter to step except for a brief instant when both inputs (that is, from source 168 and from terminal 17) to the gate 169 are positive. The lead from the source 168 is arranged to apply positive pulses to the gate 169.

The upper group of conductors 174 lead directly to the reentry 200. The conductors from terminals 6 . . . 16 inclusive lead into a circuit at B not shown in this figure but fully shown in Busch's FIG. 8 for adding some indeterminacy. The effect of pulses on terminals 6 . . . 15 is to send over the middle group of five leads into the reentry circuit 200 irregularly distributed pulses.

The five special terminals 1' to 5' of group 171 lead directly over conductors 196 to the reentry circuit 200. These terminals 1' to 5' are variously connected to terminals of the ring 167 only, the connection being such that at least four ring points are connected to each of these five terminals. This arrangement is provided to give the six values (that is, 0, 1, 2, 3, 4, 5) of output current from reentry 200 a more nearly even distribution.

As described in Busch's application, the use of the plurality of ring circuits having numbers of stages that are prime to one another together with the irregular wiring to their outputs produces a very long pulse sequence without repetition. The use of special ring 167 and of the circuits in the part of the system represented by the rectangle B further increased the indeterminacy and therefore contributes to the degree of randomness of distribution of output key pulse values.

In the Busch circuit, each of the fifteen input conductors to the reentry circuit 200 includes a weighting resistor for causing the pulse on the particular lead to have a given step value. For example, in each of the three input leads, one per group, numbered 1 a one-step pulse would be produced in the reentry input, while for a 2, 3, 4 or 5 lead there would be a pulse of corresponding step value. These weighting resistors are assumed to be included in FIG. 1 within the rectangle representing the reentry circuit 200. At the point where the fifteen leads cross the vertical dividing line A—A, the pulse value is the same in all leads whenever a pulse appears on any lead.

In applicant's reentry, the weighting resistors are not used in these leads. It is still true, however, that when a pulse appears on one of these input leads it is to be interpreted by the reentry circuit as having a pulse value corresponding to the number, 1 . . . 5, applied to the lead in the figure, as brought out in detail hereinafter.

In FIG. 4, the three groups of five input leads are numbered for convenience as group 20, group 30 and group 40. In each group, a different weighting or value is applied to each lead but in the present inventor's reentry this value is interpreted on a time basis. These leads are examined one at a time by means of time-operated gate circuits to determine if a pulse is present or absent. If a pulse is present on any given lead, the ring circuit 66 shown at the right in the figure is caused to take one or more steps depending upon the weighting factor of the given lead. As the input leads are successively examined, ring 66 takes further steps and, in effect, totals the pulses in all fifteen input conductors, and stops at the position in its cycle corresponding to this total. However, this ring also automatically reenters at step six each time it comes to the end of one cycle and begins the next. Thus step 6 is the same as step 0. This can be represented very simply as in FIG. 3 where a six-point clock is shown to illustrate the operation. The position of the hand shown is that which would result from a pulse count of either 2 or 8 or 14, etc.

After the pulses have been counted off, with their respective weightings, on ring 66 and the ring comes to rest, the pulse of definite value is transmitted to the output 69 through a gate 68. Weighting resistors 38 are used in the ring stage output leads to give a key pulse having an amplitude of step 0, step 1, step 2, step 3, step 4 or step 5 value.

For controlling the timing of the various gates, a 45-kilocycle oscillator 56 is used, together with a 15-stage ring 55 and a 3-stage ring 33. The ring 55 is driven directly from the oscillator, and steps at the rate of 45,000 steps per second. The ring 33 is controlled from ring 55 in such a way that ring 33 steps once for each complete cycle of ring 55, and therefore steps 3,000 times per second. Three steps (or one cycle) of ring 33 thus consume one millisecond of time. Since the key pulses are to be produced at the rate of 500 pulses per second, the ring 33 has time to make two cycles in one of these two millisecond pulse intervals. A suitable pulse duration for the key pulses to have is 1 millisecond of current with spaces of 1 millisecond between pulses. This allows one of the 1-millisecond rotations of ring 33 to take place during a space, and one rotation to take place during a pulse time. The rotation of ring 33 that is made during the half of the 2-millisecond time that is occupied by a key pulse is without effect since during this rotation the electron switch 36 renders the gate 37 non-transmitting so that no pulses can reach the ring 66 during this time. Gate 68 is in transmitting condition during this time, however, so as to allow the key pulse produced by ring 66 to be sent to the output or utilization circuit 69.

Referring more specifically to the sequence of operations, when ring 33 has its first or right end stage energized, it sends a pulse over lead 34 which enables all five gates 21 in the leads of group 20. This condition is maintained throughout one complete cycle of the ring 55. It will be noted that the first five stages of ring 55 counting from the left end have their outputs tied together and to lead 50. Five pulses are, therefore, sent over lead 50 to gate G5. If there is a marking pulse on the number 5 lead of group 21, this acts through the now enabled uppermost gate 21 to unblock gate G5 so that five pulses are sent through uppermost repeater tube 39 and through gate 37 to the ring 66 causing that ring to take five steps.

The next four steps of ring 55 are sent over conductor 51 to gate G4. If there is a marking pulse on the number 4 conductor of group 21, this causes gate G4 to be unblocked, allowing four pulses to be sent to ring 66, which therefore takes four more steps and stops in its number 3 position, corresponding to a total of nine steps, and assuming that the initial one of these pulses was effective on the first stage of the ring circuit 66.

In similar manner, ring 55 sends three pulses over lead 52 to gate G3, then two pulses over lead 53 to gate G2 and then one pulse over lead 54 to gate G1. These pulses are blocked if the gates G3, G2, G1 are receiving no marking pulse from an input lead in group 21, or they are repeated to ring 66 if a marking pulse is being received. A total of fifteen steps is possible if it so happens that a marking signal is on each of the five leads in group 21.

At the end of the cycle of ring 55, ring 33 is caused to take a step, and to send a pulse over lead 35 to the five gates 31 of the second conductor group 30 enabling all of these five gates. Ring 55 then proceeds as before to send five pulses to gate G5, four pulses to gate G4, etc., thereby evaluating the signal pulses on the five leads of group 30 in the same manner as was done for the five leads of group 20, these evaluations being in terms of the number of steps taken by ring 66.

After this cycle of ring 55 has been completed, ring 33 takes another step and enables the five gates 41 by sending a pulse over lead 42. On the next rotation of ring 55, each lead in group 40 is tested for presence or absence of a signal, and corresponding numbers of pulses are sent to ring 66 as before. Ring 66 finally stops at a position representing the total of all of the pulses sent into it under control of the fifteen reentry input leads, this total having been reentered at the value 6 and multiples thereof. A voltage is applied to that one of the leads 60 to 65 that is connected to the ring stage that is energized (position at which the ring stopped). This lead has connected to it a weighting resistor or network 38 that determines a particular step value of output voltage of value 0, 1, 2, 3, 4 or 5 steps corresponding to the ring stage. This value of output voltage is applied to gate 68 for transmission to the output terminal 69. At this time, that is, as ring 33 steps from step 3 to step 1, to begin a new cycle, in response to a stepping pulse from ring 55 as the latter steps from step 15 to step 1 to begin its new cycle, electronic switch 36 unblocks gate 68, blocks gate 37, and operates pulser 168. During the next three rotations of ring 55 and the simultaneous single rotation of ring 33, pulses are sent as before over leads 50 . . . 54 and over leads 34, 35 and 42 to the various gates, but these have no effect on ring 66 since gate 37 is now blocked. At the end of the cycle of ring 33, switch 36 is operated to block gate 68, restore pulser 168, and unblock gate 37, and the cycle of operations previously traced out above is repeated to cause a new totaled reentered signal to be set up on ring 66.

A more detailed description of the disclosed embodiment of the invention will now be given with specific reference to FIGS. 5, 6 and 7. Each stage of the ring circuit 55 comprises a pair of upper and lower vacuum tubes, the lower tubes conducting as a group when their cathodes are driven sufficiently negative with respect to their control grids by a negative pulse received from the 45-kilocycle source 56 over lead 57. The upper tubes conduct one at a time during the times intervening between the negative driving pulses. Assume that the ring circuit 55 has been started and that, at the moment, tube 81 (FIG. 7) is conducting. The arrival of a negative driving pulse at point 58 causes all of the lower tubes to become conducting because of the application of the negative pulse to their cathodes. The change in plate potential of tube 82 so lowers the positive potential on the controll grid of tube 81 that the latter becomes non-conducting. Because of voltage drop across the cathode resistor 83 common to the upper tubes, only a slight change in the grid potential of tube 81 in the negative direction is required to reduce the tube to cut-off condition. The consequent rise in the plate potential of tube 81 results in the transfer of a positive pulse by condenser 84 to the control grid of the upper tube 85 of the next succeeding stage of the ring circuit 55. Since tube 81 is cut off and no other upper tube is conducting, the cathode resistor 83 is without current and the tube 85 becomes conducting. The decrease in the plate potential of tube 85 drives the control grid of the lower tube 86 sufficiently negative to cause the latter to become non-conducting. The consequent rise in plate potential of tube 86 drives the grid of tube 85 more positive to hold the tube 85 in conducting condition. Timing circuit 87 in the plate-grid coupling connection between the upper and lower tubes holds tube 86 cut off for the duration of the negative pulse of the driving voltage. The firing or conduction of tube 85 and consequent decrease in its plate potential transfers a negative pulse over lead 50 to the control grid of the right triode section of the gate G5 to drive that section to cut off for the duration of the pulse. At the end of the negative pulse from the source 56, all of the lower tubes are conducting except the lower tube, namely tube 86, that is complementary to the single upper tube, namely tube 85, that is conducting. The next negative pulse incoming to the circuit 55 from source 56 causes all of the lower tubes again to be conducting, the consequent change in plate potential of tube 86 being transferred to the grid of tube 85 to make it sufficiently negative to cause tube 85 to cut off, to transfer a positive enabling pulse through the coupling condenser to the upper tube of the next succeeding stage, and through timing circuit 87 to maintain the grid of tube 86 sufficiently positive to hold the latter in conducting condition, while the next succeeding lower tube is cut off or rendered non-conducting, as explained with reference to tubes 85 and 86, as a result of the conduction by its complementary upper tube. The conduction by the latter transfers another negative pulse over the lead 50 to the right section of gate G5 to again cause that section to be cut off or non-conducting for the duration of the negative pulse. This cycle repeats itself for each negative pulse incoming to the circuit 55, with a consequent succession of negative control pulses being supplied to the right triode sections of the gates G5, G4, etc., over the leads 50, 51, etc. The negative pulse from source 56 succeeding that establishing conduction in the last of fifteenth upper tube 88 and cut off condition in the complementary lower tube of the circuit 55, causes all of the lower tubes to conduct, results in tube 88 being cut off and a positive pulse being transferred through the final coupling condenser 84 to the control grid of tube 81 to cause the latter to conduct and tube 82 to be cut off. This not only initiates another cycle of operation of the circuit 55; it causes a negative driving pulse to be supplied to the ring circuit 33 to cause the latter to take a step in its cycle of operation.

As the plate potential of tube 81 decreases to produce the negative voltage swing on lead 50, the resistancenductance combination 43, 89 in the plate lead of tube 1 differentiates the leading edge of the current pulse ausing a very sharp short voltage peak or pulse to be npressed on the control grid of amplifier tube 70, altering it from a cut-off to saturation current condition, the egative pulse output of the latter being impressed simultaneously on the cathodes of the lower tubes of the hree stage ring circuit 33.

The stages of the ring circuit 33 are arranged to operte on the same general principle as those of the circuit 5. If it is assumed that, at the time that circuit 55 had arted its first cycle of operation, as described in detail bove, upper tube 71 of the right end stage of circuit 33 as in conducting condition and its complementary wer tube 72 was cut off, the other two upper tubes ere cut off and the other two lower tubes were conucting, a negative pulse would have been supplied ver lead 34 to the control grid of the right triode secon of each of the gates 21. Normally, each right secon of each gating tube 90 would be conducting saturaon current, but the negative swing of its grid under ontrol of the plate potential of tube 71 is sufficient to use it to be cut off. This condition persists until the rcuit 33 takes the next step in its cycle of operation. he latter-mentioned step occurs when the cathodes of le lower tubes of circuit 33 are driven negatively by le pulse from amplifier 70. At that time, the lower bes of circuit 33 all conduct, the control grid of tube l is driven sufficiently negative through the coupling om plate of tube 72 to cause tube 71 to cut off. The rise tube 71 plate potential transfers a positive pulse rough coupling condenser 73 to control grid of tube l, and since cathode resistor 78 (formerly experiencing e current flow through tube 71) is no longer applying gative bias to the control grids of the upper tubes, be 74 is rendered conducting. Current again flows, erefore, through cathode resistor 78, and the control ids of the upper tubes, except tube 74, are biased to it off. As tube 74 is rendered conducting, the negative ing of plate potential of tube 74 is transferred through ning circuit 77 to control grid of lower tube 75 to cut f the latter tube until the next stepping pulse is incomg to the cathodes of the lower tubes of circuit 33. ibe 71 now being cut off, the right triode sections of e gating tubes 90 will again conduct saturation curnt; and tube 74 now being conducting, the decreased ate potential of the latter applies a negative voltage ing over lead 35 to the control grids of the right ode sections of the tubes (corresponding to tubes 90) the gates 31 of the conductor group 30. These latter ctions are thereby adjusted from a saturation current ndition to that of current cut off, for the duration of e conducting condition of tube 74, which is that of a cle of operation, namely fifteen steps, of circuit 55. The ring circuit 33 takes its next step when the circuit begins a new cycle of operation with resultant trans- through amplifier 70 of a driving pulse to the cathes of the lower tubes of circuit 33. Tube 74 is renred non-conducting thereby restoring the right secns of gates 31 to saturation current condition, upper e 79 of the left end stage of circuit 33 is rendered nducting (and its complementary lower tube nonnducting), thereby transferring over lead 42 a negae voltage swing to the control grids of the right trie sections of the tubes (corresponding to tubes 90) of gates 41 of the conductor group 40. These latter es are thereby adjusted from a saturation current ndition to that of current cut off for the duration of the conducting condition of tube 79 which will be for the time required for the circuit 55 to take fifteen steps.

The left triode section of each gating tube 90 of the gates 21, 31, 41 normally, that is, in the absence of a marking potential (negative pulse) on the respective conductor connected to its control grid, is conducting saturation current. In order for a pulse to be transferred by a particular gating tube 90 to the succeeding circuit components, both sections of the tube are required to be in current cut-off condition. Also, the left triode section of each gating tube G5, G4, etc., normally, that is, in the absence of a negative pulse incoming to its respective control grid, is conducting saturation current. In order for a pulse to be transferred by a particular gating tube G5, G4, etc., to the circuit following thereafter, both sections of the tube are required to be in cut-off condition. If, for example, during the time that the right sections of the gates 21 have been cut off under control of tube 71 over lead 34, conductor 5, for example, is not supplying a negative pulse to its respective control grid, no pulse is forwarded to the inverter stage 91 and thence to the control grid of the left triode section of gate G5. If, however, negative potential is present on conductor 5, the left section of tube 90 will be cut off, its plate potential will abruptly rise and a positive pulse will be transferred to the input of the inverter stage 91, the latter will be abruptly adjusted from current cut-off to saturation current condition, and a negative pulse will be applied to the control grid of the left section of gate G5. The latter section is thereby adjusted from current cut-off to saturation current condition, and, for each negative pulse incoming to the right section of gate G5 over lead 50 from the ring circuit 55, the plate potential of gate G5 will abruptly rise and a positive pulse will be transferred to the repeater tube 39. The same considerations apply with respect to the other conductors of group 20, and to the conductor of groups 30, 40 and their associated gates 21, 31, 41, inverter stages 91, gates G5, G4, etc. and repeater tubes 39. The latter tubes receive positive pulses from respective gates G5, G4, etc., and are swung from current cut-off to current saturation condition for each positive pulse to provide a corresponding number of negative pulses to the control grid of the left triode section of the gate 37.

The arrangement of gate 37 is such that, for it to transfer a positive pulse to the inverter stage 92, its three triode sections are required to be in current cut-off condition. Negative pulses are supplied to the grid of its center triode section to swing the latter from saturation current to cut-off condition at a rate of 45,000 times per second. Under control of the electronic switch 36, the grid of the right triode section is supplied with negative pulses to swing the latter section from saturation current to cut-off condition at a rate of 1,000 times per second. For each negative pulse incoming to the grid of the left section during the intervals when both the center and the right sections of gate 37 are cut off, the gate 37 will be cut off, its plate potential will rise abruptly and a positive pulse will be transferred to stage 92.

If it is assumed that, during the period for the described three steps of the ring circuit 33, the electronic switch 36 has been in such condition that the right section of gate 37 has been cut off, the successive pulses incoming to the gate 37 (and which represent the marking conditions on the conductors of groups 20, 30, 40 that have been noted or counted by the scanning operations of the ring circuits 33 and 55) will be transferred to stage 92, inverted thereby and applied as successive negative pulses to the cathodes of the lower tubes of the six-stage ring circuit 66.

The ring circuit 66 comprises six upper vacuum tubes and six lower complementary vacuum tubes; the cathodes of the upper tubes being connected to a common cathode resistor 68, the control grid of each upper tube being directly coupled to the plate of its complementary lower tubes, and the plate of each upper tube being condenser-coupled to the control grid of the next succeeding upper tube and coupled through a timing circuit 67 to the control grid of its complementary lower tube; and the cathodes of the lower tubes being connected to a common cathode resistor. The circuit 66 operates on the same step-by-step principle as the ring circuits 33, 55, but in response to negative driving pulses applied simultaneously to the cathodes of all of its lower tubes from the output of stage 92. The ring circuit 66 will operate step-by-step for each negative driving pulse incoming thereto, stopping at one of its stages upon receipt of the last of a succession of negative pulses representing one scanning by the ring circuits 33, 55 of the conductor groups 20, 30, 40. Inasmuch as the resistors 38 are weighted respective to the different step-values, namely, 0, 1, 2, 3, 4, and 5, associated with respective stages of the circuit 66, a negative pulse of step-value determined by the ring stage at which the circuit 66 stopped will be transferred to the control grid of the left triode section of gate 68.

Before considering in detail how the particular step-value pulse is caused to appear at the output terminal 69, description of the interrelationship of the operations of circuits 33, 55, electronic switch 36 and gates 37, 68 will be given. The electronic switch 36 is a so-called flip-flop circuit arrangement, in which either the left or the right triode section of its tube 93 is, for a given time interval, in current cut-off condition and the other section is in saturation current condition, their status being reversed in the succeeding time interval. Since the switch 36 is to be operated by a positive pulse from the circuit 33 as the latter steps from its final stage to its initial stage (that is, as tube 79 is rendered non-conducting and tube 71 conducting), and the cycle of operation of circuit 33 is completed once each millisecond, a cycle of operation of the switch 36 will require two milliseconds. The tube 93 may have a cathode common to its two sections, the driving pulse input to the tube being applied to cathode resistor 94. The plate of each triode section is coupled through a timing circuit 95 to the control grid of the other triode section. Leads 96, 97 connect the plates of the triode sections to the control grids of the right sections of gates 37, 68, respectively.

The operation of the switch 36 will be readily understood if it is assumed that the right triode section is drawing saturation current, and the other section, by virtue of the plate-to-grid intersection coupling, is in current cut-off condition. The application of a positive pulse to the cathode resistor 94 drives the cathode more positive than the grid of the conducting section. The plate potential of the latter rises, driving the grid of the other section sufficiently positive to produce a saturation current condition in the such other section, the right section of tube 93 adjusting to current cut-off condition, assisted by the plate-to-grid intersection coupling from the left to the right section. The abrupt rise of the plate potential of the right section of tube 93 causes a positive pulse to be applied over lead 96 to the grid of the right section of gate 37 to cause the latter triode section to draw saturation current, and the abrupt fall of the plate potential of the left section of tube 93 causes a negative pulse to be applied over lead 97 to the right section of gate 68 to cause the latter triode section to assume current cut-off condition. During the interval the described condition of switch 36 persists, gate 37 is blocked from transferring pulses to stage 92, but gate 68 is in condition to transmit pulses applied to its left triode section from the output of ring circuit 66. The next positive driving pulse applied to the cathode resistor 94 will in similar fashion cause the right section of tube 93 to draw saturation current and the left section of tube 93 to cut off, producing abrupt rise in the plate potential of the left section of tube 93, and restoration over lead 97 of the saturation current condition and blocking action of the right section of gate 68, and abrupt fall in the plate potential of the right section of tube 93 and restoration over lead 96 of the current cut-off condition and non-blocking action of the right section of gate 37.

With the mode of operation and functions of switch 36 now in mind, we may consider what occurs when circuit 33 steps from the left or third stage, that is, the one containing tube 79, to its right or first stage, that is, the one containing tube 71. If it is assumed that for the previous three steps of circuit 33, the right section of tube 93 has been enabled or conducting and the left section of tube 93 has been disabled or non-conducting, gate 37 will have been unblocked and gate 68 will have been blocked over leads 96, 97, respectively, and pulses appearing at the input of the gate 37 will have been transferred to the circuit 66. As tube 79 of circuit 33 is cut off, its plate potential change is transferred through coupling condenser 73 as a positive pulse not only to enable or render conducting tube 71 but also to be applied to the cathode resistor 94 of switch 36 to operate the latter as already described. The right section of tube 93 is cut off and its left section is rendered conducting, whereby, as described above, blocking potential is applied over lead 96 to gate 37 and unblocking potential is applied over lead 97 to gate 68. During the completion of the next three cycles of ring 55 and consequent stepping of circuit 33, gate 37 remains blocked and the marking potentials on the conductors of groups 20, 30, 40 that are detected during such interval by the scanning operations of circuits 33, 55 are without effect on the circuit 66. Gate 68 being unblocked, that is, its right section now being in cut-off condition rather than drawing saturation current, its left section is in condition to repeat or transfer the particular step-value indicated by circuit 66 to the input of the repeater stage 98. The positive pulse output of gate 68 will have a step value determined by the step-value of the pulse input to its left section, and after inversion by stage 98 appears at the key output terminal 69.

During the interval in which the gate 68 is thus unblocked and gate 37 blocked, the key ring stages are caused to take their next step, the control in this respect being exercised by the switch 36. The negative pulse over lead 97 to unblock the gate 68, also drives inverter tube 99 from saturation current condition to current cut-off to transfer a sharp positive driving pulse to the 500-cycle pulse source 168. This positive driving pulse abruptly converts source 168 from current cut-off to saturation current condition to generate a negative pulse to cause the key ring circuits 161, etc., to take their next steps. When the character of the pulses on leads 96, 97 is reversed, tube 99 restores to saturation current condition causing pulse source 168 to be cut off. Since the flip-flop time or period of switch 36 is two milliseconds, and the source 168 is operated once during this interval, its pulsing rate will be the required 500 times per second.

To recapitulate, in accordance with this invention a continuously varying random distribution of two-valued pulses (mark or space) is caused (by operation of key ring stages 161, etc., and the indeterminancy introducing coupling circuit between the ring stages and the reentry circuit 200) to appear on a plurality of conductors or terminal points (conductor groups 20, 30, 40). These conductors or terminal points are scanned electronically at a high rate (1,000 times a second) by a plurality of ring circuits (circuits 33, 55), and the relatively instantaneous potential condition of the conductors is quantized, individual conductors being weighted in accordance with preassigned factors, such that, for each conductor bearing a marking potential, a pulse or series of pulses (dependent on the weighting factor assigned to the particular conductor), each of equal step-value of magnitude, is generated for supply to an electronic counting or totalizing ring circuit (circuit 66). For every other one of such scannings, the series of pulses resulting therefrom is permitted access to the totalizing ring circuit which counts the pulses, and accomplishes a reentry at a preassigned step-value to maintain the resultant or final step-value of pulse to be transferred to the output terminal (69) within a preassigned maximum range of step-values. The series of pulses that might be or are developed during the alternate scannings are not utilized, an electronic switch (36) operating during such intervals to block pulse passage (at gate 37) to the totalizing ring circuit, to open a pulse passage (at gate 68) from the latter circuit to the output terminal of the key generator, and to operate the pulse generator or source for driving the key ring stages to cause the latter to take their next steps.

Although this invention has been disclosed with reference to a specific embodiment, it will be evident to those skilled in the art that it is not limited thereto and that it is applicable in other configurations without departure from the spirit and scope of the invention.

What is claimed is:

1. In a system for transmitting a quantized signal having a definite maximum value, a reentry circuit comprising a cyclically operating electronic stepper having a cycle length in step-positions corresponding to the number of steps represented by said maximum value, and successively stepping in response to step-signal input thereto, each position of said stepper including means determinative of the generation of a respective one of three-or-more valued signals, and said circuit including means for, in effect, cancelling, once or more, from the output of said circuit a preassigned whole number of said signal steps whenever the output signal value would exceed said maximum value, and means for converting a group of different step-valued signals into a series of step-pulses to step said stepper around from an initial position through the number of steps represented by said series of pulses.

2. Circuit for combining and individually weighting indications each in the form of a marking voltage on a conductor comprising means to translate each marking voltage in succession into a number of pulses determined by the weighting factor assigned to the particular conductor, a register operating in a closed cycle, said register having positions equal in number to the range of values to be indicated, means to cause said pulses to step said register around through one or more of its cycles and to stop in the position determined by the total number of said pulses, and means to produce an output current the value of which is different for each different position in which said register stops.

3. In combination, a plurality of conductors, means for applying to said conductors for a selected time interval marking and space voltages in random distribution, means to scan each conductor in succession during said time interval and to translate each marking voltage into a number of equal-valued pulses, the number of pulses being determined by a weighting factor assigned to each conductor, a register operating in a closed cycle, said register having positions equal in number to the preassigned range of values to be indicated by said register and receiving said successive pulses for operation thereby through one or more of its cycles, the register stopping in the position determined by the total number of said pulses, and means to produce an output current from said register, the value of said current being different for each different position in which the register stops.

4. The combination of claim 3 in which said scanning means comprises a plurality of electronic ring circuits.

5. The combination of claim 3 in which said scanning means comprises a plurality of electronic ring circuits, and including an electronic switch for rendering alternate scannings of said conductors ineffective with respect to said register.

6. In a system for transmitting a quantized signal having a definite maximum value, a reentry circuit comprising a cyclically operating electronic stepper having a cycle length in steps corresponding to the number of steps represented by said maximum value, a plurality of conductors having for a preselected time interval a random distribution of two-valued pulses thereon, and means to examine said conductors in sequence during said time interval and to convert a pulse on a particular conductor into a series of pulses corresponding to a weighting factor preassigned to such conductor, and means to transmit such successive series of pulses to said stepper to step the latter around through a number of steps represented by the summation of the series of pulses disclosed by examination of all of said conductors during said time interval.

7. The invention of claim 6 in which said means to examine said conductors in sequence comprises a plurality of electronic ring circuits.

8. In a system for converting a random distribution of two-valued signals into a random sequence of at least three or more valued signals, a reentry circuit comprising a cyclically operating stepping circuit having a cycle length in steps corresponding to the number of steps represented by the three or more valued signals, and means for converting said random sequence of two valued signals into a series of pulses for stepping said circuit through a number of steps represented by the number of said pulses.

9. In combination, a plurality of conductors, means for applying for a selected time interval a random distribution of two-valued potentials to said conductors, means for scanning said conductors in sequence during said interval and for converting in accordance with weighting factors assigned to said conductors, one value of said potentials on respective conductors into a series of pulses, means for counting the pulses of the successive series of pulses, and in effect, dropping back by a preassigned whole number of pulses whenever the count would otherwise exceed said whole number, and means for converting the final pulse count into a step-valued pulse not exceeding in value said preassigned whole number.

10. The combination of claim 9 in which said scanning and counting means comprise electronic ring circuits.

11. In combination, a plurality of conductors, means for applying for selected equal time intervals, a sequence of random distributions of two-valued potentials to said conductors, means for scanning said conductors in sequence during each of said intervals and for converting, in accordance with weighting factors assigned to said conductors, one value of said potentials on respective conductors into respective series of pulses, means for counting the number of pulses in the successive series of pulses during each of said time intervals and, in effect, dropping back by a preassigned whole number of pulses whenever the count would otherwise exceed said whole number, and means for converting in sequence the final pulse count for each of said time intervals into a step-valued pulse not exceeding in value said preassigned whole number.

12. The combination of claim 11 in which said scanning and counting means comprise electronic ring circuits, and in which electronic switching means isolates said counting means from said scanning means for a portion of each of said time intervals.

13. In a system for combining and individually weighting indications each in the form of a marking voltage on a conductor, means to translate each marking voltage in succession into a number of pulses determined by the weighting factor assigned to the particular conductor, a register operating in a closed cycle, said register having positions equal in number to the range of values to be indicated, means to cause said pulses to step said register around through one or more of its cycles and to stop in the position determined by the total number of said pulses, an output circuit, and means to produce an output current in said circuit the value of which is different for each different position in which said register stops.

14. In combination, a plurality of conductors, means for applying for a selected time interval a random distribution of mark and space potentials to said conductors, means for testing said conductors in sequence during said interval for presence of a mark potential thereon and for translating each such mark potential into a number of stepping pulses determined by a weighting factor preassigned to each conductor, output pulse control means operating in steps in a closed cycle and having positions equal in number to the range of output pulse values desired, means for applying said stepping pulses to said control means to cause the latter to step through one or more of its cycles and to stop in the position determined by the total number of stepping pulses, an output circuit, and means to produce an output pulse in said circuit of a value respective to the position in which said control means stops.

15. In combination, a plurality of conductors, means for supplying to said conductors during successive time intervals successive random distributions of marking and spacing potentials, means for scanning said conductors in sequence at a high rate during each of said intervals and for translating each instance of a marking potential on a respective conductor into a number of pulses determined by a weighting factor preassigned to the respective conductor, means for totalizing all of the pulses produced by one scanning operation during each said time interval, said totalizing means dropping the total back by a preassigned whole number of pulses whenever the pulse total would otherwise exceed said whole number, and means for translating the respective pulse total so obtained during each said time interval into a pulse of step-value corresponding to the respective pulse total.

16. The method of producing a series of randomly distributed pulses having different step-values falling within a selected range of values that comprises generating a series of two-valued signals, distributing said signals in a random manner during successive time intervals over a plurality of testing points, testing said points in sequence for presence of signal thereon and translating signal presence into a number of pulses determined by weighting factors preassigned to the respective testing points, totalizing the successive pulses and dropping the pulse total back by a preassigned whole number of pulses whenever the pulse total would otherwise exceed said whole number, and translating the resultant pulse total for each time interval into a step-valued pulse respective to said pulse total.

17. In combination, a plurality of stepping means each producing a sequence of two-valued potentials at like frequency, pulsing means for operating said first-mentioned means simultaneously at that frequency, a plurality of testing points, means for randomly distributing said potentials over said points, means for cyclically testing said points for presence thereon of one value of said potentials and for translating presence of such potential into a number of pulses determined by weighting factors preassigned to respective testing points, utilization means for said pulses, and means for driving said pulsing means during alternate cyclical tests of said testing points.

18. In combination, a plurality of stepping means, each for producing a sequence of mark and space potentials at like frequency but different sequence repetition rates, pulsing means for driving said stepping means simultaneously at said frequency, a plurality of leads, means for randomly distributing said sequences of potentials over said leads, means for cyclically testing said leads for mark potentials thereon and for translating such potentials into a number of equal-valued pulses determined by weighting factors preassigned to respective leads, means for totalizing such pulses, and means for preventing access of said pulses to said totalizing means during alternate cyclical tests of said leads and for simultaneously driving said pulsing means.

19. In combination, stepping means for generating multivalued signals, pulsing means for driving said stepping means, a plurality of testing points, means for distributing said signals in random manner over said testing points, and means for testing said points for producing a number of pulses determined by the signal indicated and the weighting factors assigned to respective points, said last-mentioned means including means for driving said pulsing means at preassigned interval.

20. In combination, stepping means for generating multivalued signals, pulsing means for driving said stepping means, a plurality of testing points, means for distributing said signals over said testing points, and means for testing said points for producing a number of pulses determined by the signal condition thereon and the respective testing point, said last-mentioned means including means for driving said pulsing means.

21. In a system for transmitting a quantized signal having a definite maximum value, a reentry circuit comprising a cyclically operating electronic stepper having a cycle length in steps corresponding to the number of steps represented by said maximum value, and successively stepping in response to two-valued equal-duration signals input thereto, each stage of said stepper including means determinative of the generation of a respective one of three-or-more valued, equal-duration signals, and means to step the said stepper around for any number of such two-valued signals from an initial position through the number of steps represented by such number of said two-valued signals.

22. In combination, means for generating two-valued equal-duration signals, a plurality of testing points, means for distributing said signals in random manner among said testing points, means for weighting said testing points such that the presence of one value of said two-valued signals on respective points enables generation of a respective number of other two-valued signals of equal duration, and means for totalizing any number of such other pulses, and for producing a lesser number of three-or-more valued equal-duration signals, said last-mentioned means comprising an electronic ring circuit having a number of stages equal to that of the number of three-or-more valued signals, each stage including means determinative of the production of a respective one of said three-or-more valued signals.

23. A system for converting a random distribution of two-valued equal-duration signals into a random sequence of at least three-or-more valued signals of equal duration but respectively different amplitude, comprising a reentry circuit including an electronic ring circuit having a cycle length in stages corresponding to the number of different amplitudes of said three-or-more valued signals, and means for converting such a random distribution of said two-valued signals into a series of equal-duration pulses for stepping said ring circuit through a number of stages represented by the number of said pulses and in which the number of said pulses may exceed the number of stages in said ring circuit.

* * * * *